Aug. 9, 1960  O'DELL O'KELLEY  2,947,990
APPARATUS FOR FORMING AND DRIVING JOINT NAILS
Filed Dec. 5, 1956  2 Sheets-Sheet 1
Fig. 1.
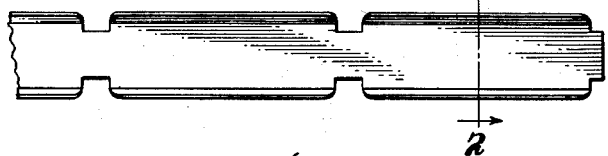
Fig. 2.
Fig. 3.
Fig. 4.
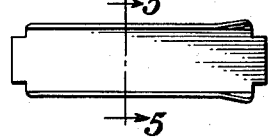
Fig. 5.
Fig. 10.
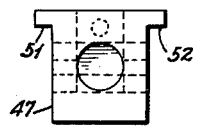
Fig. 6.
Fig. 8.
Fig. 11.
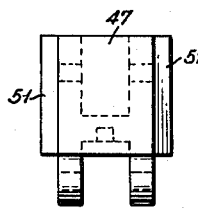
Fig. 9.
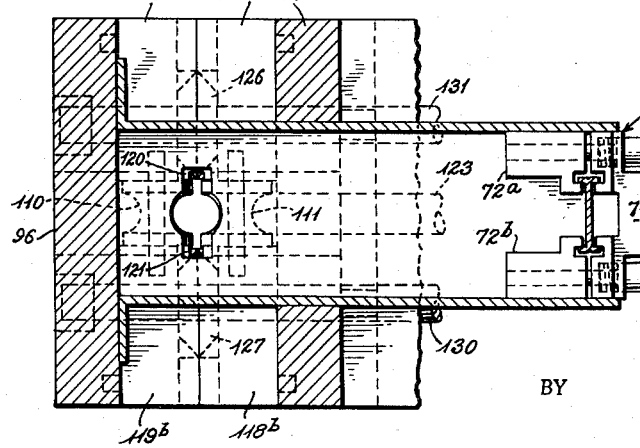
INVENTOR
*O'Dell O'Kelley*
BY
ATTORNEY Aug. 9, 1960 O'DELL O'KELLEY 2,947,990
APPARATUS FOR FORMING AND DRIVING JOINT NAILS
Filed Dec. 5, 1956 2 Sheets-Sheet 2
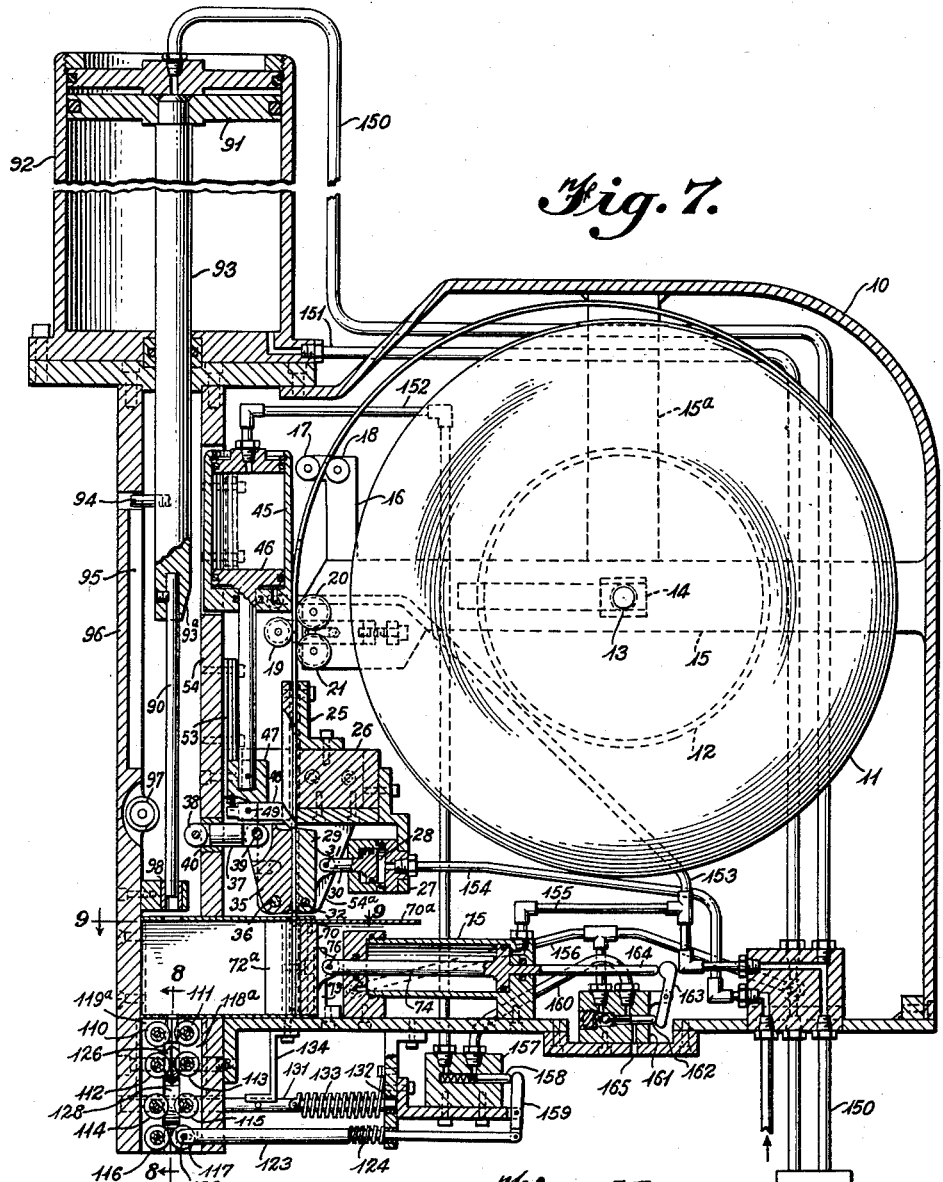
Fig. 7.
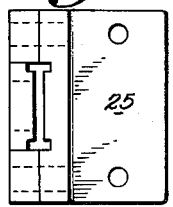
Fig. 12.
Fig. 13.
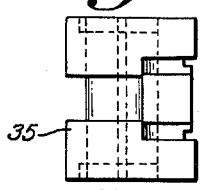
Fig. 14.
INVENTOR
O'Dell O'Kelley
BY
M.R. Porter
ATTORNEY

United States Patent Office 2,947,990
Patented Aug. 9, 1960

2,947,990

APPARATUS FOR FORMING AND DRIVING JOINT NAILS

O'Dell O'Kelley, Rte. 2, Candler, N.C.

Filed Dec. 5, 1956, Ser. No. 626,466

14 Claims. (Cl. 1—44.4)

This application is a continuation-in-part of copending application Serial No. 418,137, filed March 23, 1954, now Patent No. 2,900,638, dated August 25, 1959.

This invention relates to a machine for driving metal clamp nails or joint nails and more particularly to a machine capable of continuously transforming a roll of partially formed clamp nails or joint nails into a plurality of individual finished nails and automatically driving the individual nails into two members to be fastened together. The terms "clamp nail," "joint nail" and "nail" are interchangeably used herein.

It is an object of the present invention to provide an improved apparatus for fastening two work pieces together.

Another object is to provide an improved system for feeding clamp nails or joint nails to a clamp nail driver.

Another object is to provide an improved machine for driving joint nails which has new and original control and safety features.

Another object is to provide an improved machine for processing a continuous strip of partially formed nails into a plurality of individual finished nails and driving the individual nails into a work piece.

Other objects will appear from the following description taken in conjunction with the annexed drawings wherein:

Figure 1 is a plan view of a portion of a continuous strip of partially formed nails made in accordance with the invention;

Figure 2 is a section view taken along the line 2—2 of Figure 1;

Figure 3 is an elevation view of the strip of partially formed nails of Figure 1;

Figure 4 is a plan view of an individual finished joint nail made in accordance with the present invention;

Figure 5 is a section view taken along the line 5—5 of Figure 4;

Figure 6 is an elevation view of the nail shown in Figure 4;

Figure 7 is a view principally in section taken through the central axis of a machine constructed in accordance with the present invention;

Figure 8 is an enlarged section view taken along the line 8—8 of Figure 7;

Figure 9 is an enlarged section view taken along the line 9—9 of Figure 7;

Figures 10 and 11 are detailed views of a ratchet piston extension member used in the machine of Figure 7;

Figure 12 is a plan view of a nail guide member used in the machine of the present invention;

Figure 13 is a detailed view of a nail straightener roller used in the machine of the present invention; and Figure 14 is a plan view of a shear member used in the machine of the present invention.

Referring now to the drawings and particularly Figure 7 thereof, the numeral 10 designates a housing frame for the feed roll and various other components of the apparatus. Disposed withing housing frame 10 in the upper portion thereof is a continuous roll of a strip of partially formed joint nails 11. Roll 11 is carried by reel 12 which is in turn carried by freely rotatable axle 13. Axle 13 is mounted in adjustable bushing 14 so as to make the position of axle 13 adaptable to reels of various diameters. Axle 13 and bushing 14 are mounted on stabilizing member 15 which is connected to housing frame 10 and to a vertical stabilizing member 15a, as shown.

Further details of the strip of partially formed joint nails 11 may be had by reference to Figures 1-3. As shown there, the continuous strip of partially formed nails consists of a thin main body portion the edges of which have been pre-flared to begin the formation of a flange in such a manner that each edge in cross section resembles a V shape (Figure 2). This V-shaped portion should define an angle of not more than about 15 degrees, that is the so-called concluded angle should not be more than about 15 degrees. Throughout the length of the strip, portions which are to be formed into individual nails are separated by indentations or notched portions cut out on opposite sides of the strip. As seen in Figures 1 and 3, these notched portions extend well past the flange portion into the main body of the metal strip.

The strip of partially formed nails shown in Figures 1-3 and eminently suitable for use in the present invention may readily be formed from a strip of commercially available metal stock such as aluminum, steel, bronze, or the like. For example, a strip of cold rolled steel about 0.040 inch thick and about ⅝ inch wide of indefinite length may be used. The pre-flared flange portions of the strip may be formed by passing the strip through a suitable shaping die provided with a pair of spaced freely rotatable edge splitting rollers similar to the rollers 126, 127 to be described below. Other equally suitable methods of pre-flaring or splitting these flange portions of the nail strip will occur to those skilled in the art. The notched or indented portions of the nail strip may be punched out at desired intervals by a suitable punching press either in connection with the pre-flaring operation or otherwise. The strip of partially formed nails is preferably packaged in reel form for convenience in handling and for use in the machine of this invention.

At the left side of member 15 is connected a bracket supporting member 16 on which are mounted a pair of spaced freely rotatable nail guide rollers 17, 18. Also mounted at the left side of member 15 are a set of three freely rotatable nail straightener rollers 19, 20, 21. Roller 19 may be adjusted so as to move it closer to or further away from rollers 20 and 21. Rollers 17–21 (inclusive) are of the type shown in detail in Figure 13.

Disposed beneath the assembly of straightener rollers 19–21 is a nail guide entrance member 25 (Figure 12) and a nail guide member 26. Guide members 25 and 26 are connected together by any suitable means and are supported in place by means of bolts attaching them to special bracket members such as 54a, which are bolted to partition supporting member 54 to be later described.

Hung from and supported by guide member 26 is a small pneumatic cylinder 27, the piston 28 of which is connected to a pressure pad or back-up member 29 by means of brackets 30 and pin 31. Member 29 is mounted for pivotal movement around pin 32. Pin 32 passes through the special bracket members such as 54a. Disposed in spaced relation from back-up member 29 so as to form between them a nail guide is shear member 35. (See Figure 14.) Shear member 35 is mounted for pivotal movement around pin 36 which also passes through the special bracket members such as 54a. The means for actuating shear member 35 comprises a reciprocable shaft 37 provided at one end with a freely rotatable roller 38, The opposite end of shaft 37 is bifurcated and connected to shear member 35 by means of pin 39. Shaft 37 is slidably mounted in bushing member 40 carried in partition supporting member 54.

The mechanism by which the strip of partially formed nails are fed into the guide members 25, 26 comprises pneumatic cylinder 45, piston 46 and an assembly attached to the lower end of piston 46. This assembly consists of a piston extension 47 (see Figures 10 and 11) to the bifurcated end of which is attached a bifurcated ratchet member 48 adapted to reciprocate in grooves in guide members 25, 26. Member 48 is mounted for limited pivotal movement around pin 49 passing through extension 47.

It will be noted that a portion of the bottom surface of extension member 47 is relieved so as to permit the bifurcated extensions of member 48 to move downward and effect a lateral movement to disengage the roll of nails in members 25, 26 when piston 46 retracts. The spring shown in the drawing tends to resist this movement. Vertical extensions 51, 52 on member 47 are adapted to ride in corresponding grooves such as the one shown in a guide indicated by the numeral 53 in Figure 7. Guide 53 is connected to partition supporting member 54.

Disposed beneath the nail shearing assembly is a reciprocable nail receiving mechanism indicated generally at 70. (See Figure 9.) Member 70 is composed of a first bifurcated section 71 and two other sections 72a, 72b. These three members define therebetween a nail and driving shaft guide. Section 71 normally tends to fit flush against sections 72a, 72b by virtue of the spring members shown recessed in the shoulders of section 71. These spring members are coaxially disposed around two bolt members one end of which is connected to members 72a, 72b, respectively, and the head ends of which are adapted to contact a stop member such as 73. When the mechanism 70 is retracted to the right, as shown in Figure 7, and the bolt heads brought into contact with suitably arranged stops such as the one 73, the springs no longer urge section 71 into contact with sections 72a, 72b, and the clamp nail is readily received into the nail receiving mechanism. When mechanism 70 moves to the left (Figure 7) out of contact with the stop 73, the spring members again urge sections 72a, 72b, toward section 70 so as to fit snugly around the nail being transported in the nail guide. Section 71 is connected to shaft 74 of pneumatic cylinder 75 by means of pin 76.

The main nail driving shaft of the present invention is designated with the numeral 90. The shaft 90 comprises an extension of shaft 93 connected to piston 91 of air cylinder 92. Affixed to shaft 93 is guide pin 94 adapted to reciprocate in groove 95 in the front wall 96 of the machine. A bevelled shoulder 93a on the end of shaft 93 is adapted to co-act with roller 38 and actuate shaft 37 connected to shear member 35. A back-up roller 97 mounted in a recess in wall 96 tends to stabilize the nail driving shaft when this operation occurs. The shaft 90 is adapted to reciprocate in bushing member 98 attached to wall 96.

Disposed beneath the nail driving shaft 90 is an assembly which serves the dual purpose of completing the formation of the nail and guiding it from the machine into contact with a work piece located outside the machine. This assembly comprises four pairs of guiding rollers, 110–117, inclusive, mounted in freely rotatable fashion in members 118a, 118b, 119a, 119b, shown in Figure 9. The surface of rollers 110–117 is of a concave shape so as to define throughout the roller assembly a vertical guide for nail driving shaft 90. (See Figure 9.) Recesses 120–121 formed by the block members supporting the rollers define a guide for the flange sections of the nail.

It will be noted that the roller 117 differs from the rollers 110–116 in that, instead of being mounted on a fixed shaft, it is axially split and mounted on a pin 122 movably carried by reciprocable shaft member 123. Pin 122 is adapted to slide in a horizontal plane in elongated slots in block members 118a, 118b. Member 123, which is in Figure 7 biased by spring 124 toward the left so that roller 117 is in contact with roller 116, extends through partition supporting member 54 which serves to enclose one side of the roller assembly. By virtue of this type mounting, roller 117 is moved slightly to the right (Figure 7) when a nail or shaft 90 occupies the space between rollers 116, 117. When a nail or the shaft 90 no longer occupies this space, the roller 117 is urged back to the left into contact with roller 116 by spring 124.

Two additional pairs of nail shaping rollers 126–129, inclusive, shown in Figure 8, are mounted on shafts normal to the shafts of rollers 110–117. The shafts of freely rotatable rollers 126 and 127 are mounted in wall 96 and supporting member 54. The surface of rollers 126, 127 are bevelled to a 90 degree angle and protrude into recesses 120, 121 so as to contact the flange portion of the nail being forced through the roller assembly. This sharpened portion of rollers 126, 127 serves the purpose of further flaring the edges of the partially formed nail.

Rollers 128, 129 are disposed beneath rollers 126, 127 and are fixed to shafts 130, 131, respectively, preferably by keyways. As seen in Figure 7, shaft 131 extends from a bushing 132, through supporting member 54 to an opening in wall 96. Axial displacement of shaft 131 is opposed by spring 133 and upon rotation of shaft 131, spring 133 tends to return the shaft to its original position in contact with stop member 134. Shaft 130 is provided with parts (not shown) corresponding to 132, 133 and 134. Rollers 128 and 129 are provided with a substantially flat surface. The radius of rollers 128, 129 is non-uniform and it will be noted (Figure 8) that each of these rollers is provided on its flat surface with a shoulder or offset portion adapted to momentarily contact the leading edge of the flange portion of the nail being forced through the roller assembly. This roller design is adapted to accomplish a dual purpose: first, the offset portion of the roller flares the end portion of the nail which is first driven into the work piece; second, the flat surface of the roller completes the flaring operation on the flange portions of the nail.

The finished joint nail which issues from the roller assembly is shown in Figures 4–6. As seen, the finished nail comprises a flat body portion and substantially flat flange portions on either side. The leading edge of the nail, or the edge which is to first enter the work pieces, is flared outwardly slightly from the action of rollers 128, 129. This feature is responsible for the nail "clamping" the work pieces together when the nail enters.

The pneumatic control system of the present machine will now be described. Air cylinder 92 is provided with conduits 150, 151 to supply air for driving piston 91 down and up, respectively. Air cylinder 45 is provided with conduits 152, 153 to supply air for driving piston 46 down and up, respectively. Air cylinder 27 is supplied with air by conduit 154. Air cylinder 75 is provided with conduits 155, 156 to supply air for driving shaft 74 to the left and right, respectively. The supply of air to conduit 152 is governed by air valve 157 comprising spring biased member 158 responsive to upright pivoted arm 159 attached to the end of reciprocable member 123. Conduit 160 supplies air to valve 157. With this arrangement, air can not effectively pass from conduit 160 to conduit 152 so long as member 123 is moved toward the right (or so long as a nail is positioned in contact with roller 117).

The supply of air to conduit 160 in turn is dependent on the operation of air valve 161 which comprises spring biased member 162 actuated by pivoted arm 163 which is responsive to the movement of extension 164 on the piston of shaft 74 of air cylinder 75. Conduit 156 supplies air to air valve 161. With this arrangement, air can not effectively pass from conduit 156 into conduit 160 unless the shaft 74 has moved to the right (the position shown in Figure 7). When the member 162 of valve 161 moves to the right, exhaust port 165 communicates with conduit 160. A four-way air valve 166, such as the one described in copending application Serial No. 418,137, provided with foot lever 167 controls the air in conduits 150, 151 and thus controls the operation of the machine. Conduit 150 is connected to conduits 153 and 155.

The manner in which the machine operates is believed to be apaprent from the foregoing description of the arrangement of the parts. When the lever 167 is actuated by the operator, air enters conduit 150. This causes the following to occur: (1) Shaft 74 moves to the left causing nail receiving the mechanism 70 (carrying a nail) to move into position under shaft 90; (2) nail driving shaft 90 then moves downwardly through the roller assembly and drives a nail into a work piece positioned under the machine; (3) piston 46 retracts upwardly carrying ratchet member 49 with it. This puts member 49 in position to intercept a notch in the strip of nails extending through straightener rollers 19, 20, 21. Air is exhausted from cylinder 45 via conduits 152 and 160 to exhaust port 165 of valve 161 which port is now open due to shaft 74 being moved to the left and valve member 162 being moved to the right.

Now, when (2) above occurs, it will be apparent that bevelled shoulder 93a of shaft 93 contacts roller 38 and causes shaft 37 and shear member 35 to move to the right, effecitvely severing a previously fed nail from roll 11. The nail positioned between shear member 35 and back-up member 29 is prevented from falling downward by cover member 70a of nail receiving nail mechanism 70.

At this stage of the operation, member 123 has moved to the right under the influences of now extended shaft 90 and effectively prevents air from entering conduit 152. Since shaft 74 has moved to the left, the bottom part of pivot arm 163 is urged to the right and air is prevented from entering conduit 160. It is thus obvious that, before air can be supplied to the upper part of air cylinder 45, two conditions must be satisfied: (a) Shaft 74 must be withdrawn to the right so as to position nail receiving mechanism 70 under the nail guide defined by shear member 35 and back-up member 29, and (b) the space between rollers 116, 117 must not be obstructed by a nail or by shaft 90.

Lever 167 is then released. This results in air being introduced into conduit 151 causing piston 91 of air cylinder 92 to rise, withdrawing nail driving shaft 90 upwards. Air is exhausted from cylinder 92 via conduit 150 and valve 166. When shaft 90 retracts, shear member 35 moves to the left due to the constant pressure exerted thereon by air cylinder 27 and backup member 29.

Introducing air into conduit 151 also establishes air pressure in conduit 156, causing shaft 74 of air cylinder 75 to retract to the right. Air escapes from cylinder 75 via conduits 155 and 150. This places nail receiving mechanism 70 under the nail guide defined by shear member 35 and back-up member 29; at the same time, it actuates lever 163 permitting air to flow from conduit 156 into conduit 160. If a nail is not occupying the space between rollers 116, 117, the air flowing into conduit 160 passes through air valve 157 and conduit 152 into the top of air cylinder 45 causing piston 46 to be driven downward, carrying ratchet 49 with it. When ratchet member 49 starts moving downward the bifurcated tips thereof intercept a notch in the strip of clamp nails. This results in moving the continuous strip of nails downwardly also. The downward movement of the continuous strip of nails forces the previously severed nail contained between shear member 35 and back-up member 29 to fall downward into the waiting nail receiving mechanism 70.

On the other hand, if a nail is hung up in the roller assembly, occupying the space between rollers 116, 117, air will not be introduced into conduit 152 with the result that piston 46 remains in the raised position and a nail is not fed into nail receiving mechanism 70.

The nail driving shaft 90 is now retracted and the machine is ready for another cycle.

It is believed to be evident that the machine just described, in addition to having new and unusual arrangement of parts, contains safety features in the anti-jamming means which go far toward eliminating one of the more troublesome aspects of automatic nailing machines. Inasmuch as various modifications of this invention will occur to others I intend to be limited only by the scope of the following claims. While the foregoing description has been limtied to a single nail driving head it is to be understood that the features of the present invention may, if desired, be incorporated into a "two headed" machine capable of consecutively driving one nail in a downward and then another nail in an upward direction ino opposite sides of a work piece, as taught in my above mentioned copending application Serial No. 418,137.

What is claimed is:

1. Apparatus for fastening two work pieces together comprising in combination a source of joint nails, means for positioning one of said joint nails in front of a reciprocatable nail driving shaft, a nail and shaft guide assembly comprising a plurality of vertically disposed pairs of rollers defining a vertical guide for said shaft and a joint nail being driven thereby, jam-preventing means comprising means for resiliently urging one roller of the lowermost pair of said rollers toward the other member of that pair in a plane substantially normal to the axis of said shaft so that said roller is displaced when a joint nail is being driven in said vertical guide between said lowermost pair of rollers, and means responsive to the position of said displaceable roller for controlling the positioning of another joint nail in front of said driving shaft, said guide being aligned with said shaft and means for reciprocating said shaft in said guide.

2. Apparatus for fastening two work pieces together comprising in combination means for feeding a continuous strip of partially formed joint nails, means for severing an individual joint nail from said strip, means for positioning said joint nail in front of a nail driving shaft, a nail and shaft guide assembly for guiding said nail and said shaft, jam-preventing means responsive to the movement of a nail through said guide assembly and adapted to prevent a second nail from being driven into said guide assembly before the previous nail has been removed therefrom and means for reciprocating said shaft in said assembly.

3. Apparatus for fastening two work pieces together comprising in combination means for rotatably holding a reel of a continuous strip of notched, partially formed joint nails, means for engaging the notches in said strip and advancing the strip of joint nails, a nail driving shaft, a shearing edge actuated by said shaft for severing an individual joint nail from said strip, a shearing back-up member opposing the force of said shearing edge, means for positioning said joint nail in front of said nail driving shaft, a nail and shaft guide assembly comprising a plurality of vertically disposed pairs of rollers defining a vertical guide for said shaft and a joint nail being driven thereby, said guide being aligned with said shaft and means for reciprocating said shaft in said guide.

4. Apparatus for fastening two work pieces together comprising in combination means for rotatably holding a reel of a continuous strip of notched, partially formed joint nails, means for engaging the notches in said strip and advancing the strip of joint nails, a nail driving shaft, a shearing edge actuated by said shaft for severing an individual joint nail from said strip, a shearing back-up member opposing the force of said shearing edge, means for positioning said joint nail in front of said nail driving shaft, a nail and shaft guide assembly comprising a plurality of vertically disposed pairs of rollers defining a vertical guide for said shaft and a joint nail being driven thereby, said guide being aligned with said shaft, jam-preventing means comprising means for resiliently urging one roller of the lowermost pair of said rollers toward the other member of that pair in a plane substantially normal to the axis of said shaft so that said roller is displaced when a joint nail is being driven in said vertical guide between said lowermost pair of rollers, and means responsive to the position of said displaceable roller for controlling the positioning of another joint nail in front of said driving shaft, said guide being aligned with said shaft and means for reciprocating said shaft in said guide.

5. Apparatus for fastening two work pieces together comprising in combination means for rotatably holding a reel of a continuous strip of notched, partially formed joint nails, pneumatically actuated means for engaging the notches in said strip and unwinding said reel to advance the strip of nails, a pneumatically driven nail driving shaft, a pivoted shearing edge actuated by said shaft and adapted to be forced against said strip of nails for severing an individual joint nail from said strip, a pneumatically actuated pivoted back-up member opposing the force of said shearing edge, a nail receiving member for receiving the severed joint nail, pneumatic means for positioning said nail receiving member and said nail in front of said nail driving shaft, and a nail and shaft guide assembly for guiding said nail and said shaft.

6. Apparatus for fastening two work pieces together comprising in combination means for rotatably holding a reel of a continuous strip of notched, partially formed joint nails, pneumatically actuated means for engaging the notches in said strip and unwinding said reel to advance the strip of nails, a pneumatically driven nail driving shaft, a pivoted shearing edge actuated by said shaft and adapted to be forced against said strip of nails for severing an individual joint nail from said strip, a pneumatically actuated pivoted back-up member opposing the force of said shearing edge, a nail receiving member for receiving the severed joint nail, pneumatic means for positioning said nail receiving member and said nail in front of said nail driving shaft, a nail and shaft guide assembly comprising a plurality of vertically disposed pairs of rollers defining a vertical guide for said shaft and a joint nail being driven thereby, said guide being aligned with said shaft.

7. Apparatus for fastening two work pieces together comprising in combination means for rotatably holding a reel of a continuous strip of notched, partially formed joint nails, pneumatically actuated means for engaging the notches in said strip and unwinding said reel to advance the strip of nails, a pneumatically driven nail driving shaft, a pivoted shearing edge actuated by said shaft and adapted to be forced against said strip of nails for severing an individual joint nail from said strip, a pneumatically actuated pivoted back-up member opposing the force of said shearing edge, a nail receiving member for receiving the severed joint nail, pneumatic means for positioning said nail receiving member and said nail in front of said nail driving shaft, a nail and shaft guide assembly comprising a plurality of vertically disposed pairs of rollers defining a vertical guide for said shaft and a joint nail being driven thereby, said guide being aligned with said shaft, jam-preventing means comprising means for resiliently urging one roller of the lowermost pair of said rollers toward the other member of that pair in a plane substantially normal to the axis of said shaft so that said roller is displaced when a joint nail is being driven in said vertical guide between said lowermost pair of rollers, and means responsive to the position of said displaceable roller for controlling said pneumatically actuated means for engaging the notches in and advancing said strip of nails, said guide being aligned with said shaft and means for reciprocating said shaft in said guide.

8. Apparatus for fastening two work pieces together comprising in combination means for rotatably holding a reel of a continuous strip of notched, partially formed joint nails, pneumatically actuated means for engaging the notches in said strip and unwinding said reel to advance the strip of nails, a pneumatically driven nail driving shaft, a pivoted shearing edge actuated by said shaft and adapted to be forced against said strip of nails for severing an individual joint nail from said strip, a pneumatically actuated pivoted back-up member opposing the force of said shearing edge, a nail receiving member for receiving the severed joint nail, pneumatic means for positioning said nail receiving member and said nail in front of said nail driving shaft, a nail and shaft guide assembly comprising a plurality of vertically disposed pairs of rollers defining a vertical guide for said shaft and a joint nail being driven thereby, said guide being aligned with said shaft, and a nail finishing roller assembly comprising a plurality of vertically disposed pairs of nail finishing rollers disposed at right angles to said nail and shaft guide assembly rollers, at least one of said pairs of nail finishing rollers having a sharpened nail contacting surface and at least one of said pairs of nail finishing rollers having a substantially flat nail contacting surface adapted to complete the formation of the flange portion of the joint nail.

9. Apparatus for fastening two work pieces together comprising in combination means for rotatably holding a reel of a continuous strip of notched, partially formed joint nails, pneumatically actuated means for engaging the notches in said strip and unwinding said reel to advance the strip of nails, a pneumatically driven nail driving shaft, a pivoted shearing edge actuated by said shaft and adapted to be forced against said strip of nails for severing an individual joint nail from said strip, a pneumatically actuated pivoted back-up member opposing the force of said shearing edge, a nail receiving member for receiving the severed joint nail, pneumatic means for positioning said nail receiving member and said nail in front of said nail driving shaft, a nail and shaft guide assembly comprising a plurality of vertically disposed pairs of rollers defining a vertical guide for said shaft and a joint nail being driven thereby, said guide being aligned with said shaft, and a nail finishing roller assembly comprising a plurality of vertically disposed pairs of nail finishing rollers disposed at right angles to said nail and shaft guide assembly rollers, at least one of said pairs of nail finishing rollers having a sharpened nail contacting surface and at least one of said pairs of nail finishing rollers having a substantially flat nail contacting surface adapted to complete the formation of the flange portion of the joint nail, jam-preventing means comprising means for resiliently urging one roller of the lowermost pair of said nail and shaft guide assembly rollers toward the other member of that pair in a plane substantially normal to the axis of said shaft so that said roller is displaced when a joint nail is being driven in said vertical guide between said lowermost pair of rollers, and means responsive to the position of said displaceable roller for controlling said pneumatically actuated means for engaging the notches in said strip and unwinding said reel to advance the strip of nails.

10. Apparatus for fastening two work pieces together comprising in combination a source of a continuous strip of nails, a reciprocatable nail driving shaft, a nail and shaft guide assembly for guiding said shaft and one of said nails being driven thereby, shearing means actuated by said shaft and adapted to sever an individual nail from said strip during one driving cycle of said shaft, and means for positioning said severed nail in front of said shaft for driving during the next driving cycle of said shaft.

11. Apparatus for fastening two work pieces together comprising in combination a source of joint nails, means for positioning one of said joint nails in front of a reciprocatable nail driving shaft, a nail and shaft guide assembly comprising a plurality of vertically disposed pairs of rollers defining a vertical guide for said shaft and the body portion of a joint nail being driven thereby, said guide being aligned with said shaft, means defining a pair of vertical passageways to accommodate the flange portions of a joint nail passing through said vertical guide, and means for reciprocating said shaft in said guide.

12. Apparatus for fastening two work pieces together comprising in combination means for feeding a continuous strip of partially formed joint nails, means for severing an individual joint nail from said strip, means for positioning said joint nail in front of a nail driving shaft, a nail and shaft guide assembly comprising a plurality of vertically disposed pairs of rollers defining a vertical guide for said shaft and the body portion of a joint nail being driven thereby, said guide being aligned with said shaft, means defining a pair of vertical passageways to accommodate the flange portions of a joint nail passing through said vertical guide, and means for reciprocating said shaft in said guide.

13. Apparatus for fastening two work pieces together comprising in combination means for feeding a continuous strip of partially formed joint nails, means for severing an individual joint nail from said strip, means for positioning said joint nail in front of a nail driving shaft, a nail and shaft guide assembly comprising a plurality of vertically disposed pairs of rollers defining a vertical guide for said shaft and a joint nail being driven thereby, said guide being aligned with said shaft, jam-preventing means comprising means for resiliently urging one roller of the lowermost pair of said rollers toward the other member of that pair in a plane substantially normal to the axis of said shaft so that said roller is displaced when a joint nail is being driven in said vertical guide between said lowermost pair of rollers, and means responsive to the position of said displaceable roller for controlling the positioning of another joint nail in front of said driving shaft, said guide being aligned with said shaft and means for reciprocating said shaft in said guide.

14. Apparatus for fastening two work pieces together comprising in combination means for rotatably holding a reel of a continuous strip of notched, partially formed joint nails, means for engaging the notches in said strip and advancing the strip of joint nails, a nail driving shaft, shearing means actuated by said shaft and adapted to sever an individual joint nail from said strip during one driving cycle of said shaft, means for positioning said severed nail in front of said shaft for driving during the next driving cycle of said shaft, a nail and shaft guide assembly for guiding said nail and said shaft and means for reciprocating said shaft in said assembly.

References Cited in the file of this patent

UNITED STATES PATENTS

| | | |
|---|---|---|
| 341,413 | Fowler | May 4, 1886 |
| 739,811 | Baldenweg | Sept. 29, 1903 |
| 1,282,215 | Goddu | Oct. 22, 1918 |
| 1,372,685 | Goddu | Mar. 29, 1921 |
| 1,904,288 | McChesney | Apr. 18, 1933 |
| 2,170,462 | Putnam | Aug. 22, 1939 |
| 2,229,868 | Newell | Jan. 28, 1941 |
| 2,617,098 | Lenart | Nov. 11, 1952 |
| 2,673,344 | Sandberg | Mar. 30, 1954 |

FOREIGN PATENTS

| | | |
|---|---|---|
| 446,389 | Great Britain | Apr. 29, 1936 |